Patented June 15, 1954

2,681,366

UNITED STATES PATENT OFFICE 2,681,366

PRODUCTION OF 2 - KETO - 10 - METHYL-
1,2,5,8,9,10-HEXAHYDRONAPHTHALENE

Robert B. Woodward, Belmont, Mass., assignor to
Research Corporation, New York, N. Y., a corporation of New York No Drawing. Application January 31, 1952,
Serial No. 269,328

2 Claims. (Cl. 260—586)

This invention relates to methods and compounds useful in the production of steroids, particularly the adrenal cortical hormones such as cortisone.

In the following outline of the methods of the invention reference is had to the illustrative sequence of novel compounds of the invention.

In the structure formulas in the chart, methyl groups attached to carbon atoms common to two rings are indicated by the conventional line extending from the carbon atom, and Ac indicates the residue of an organic carboxylic acid, such as acetic acid.

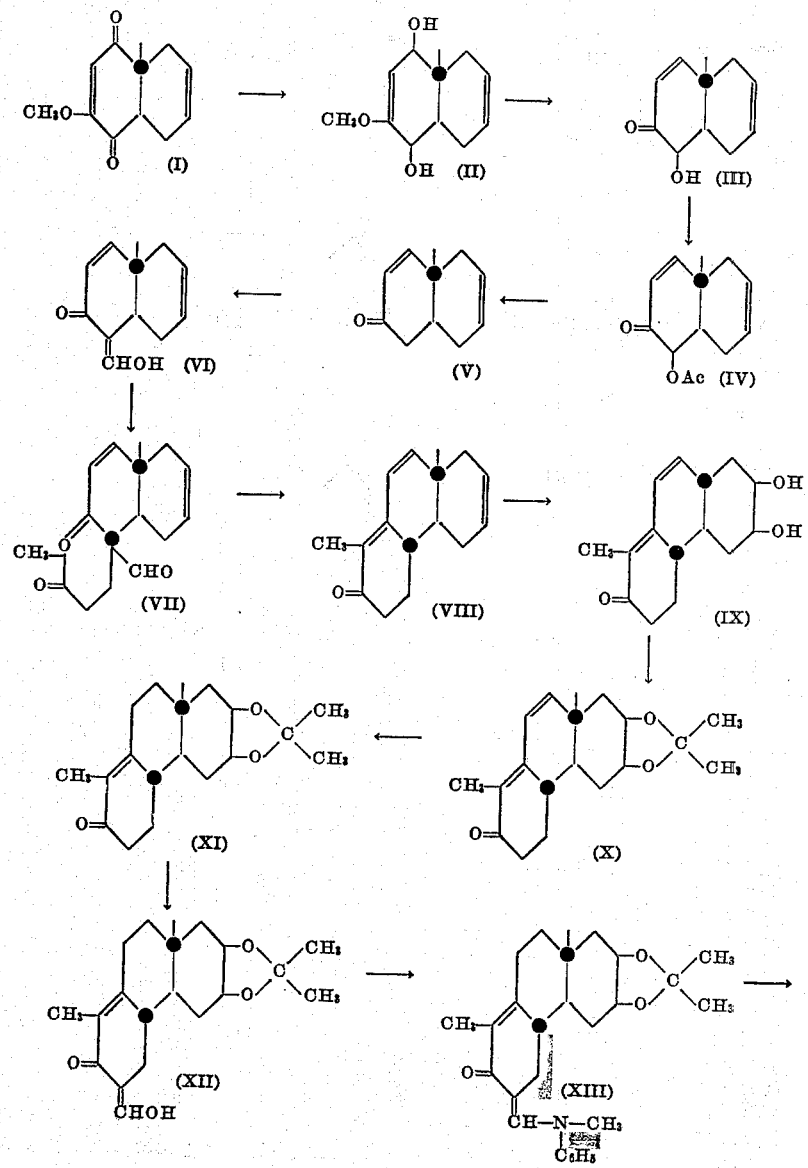

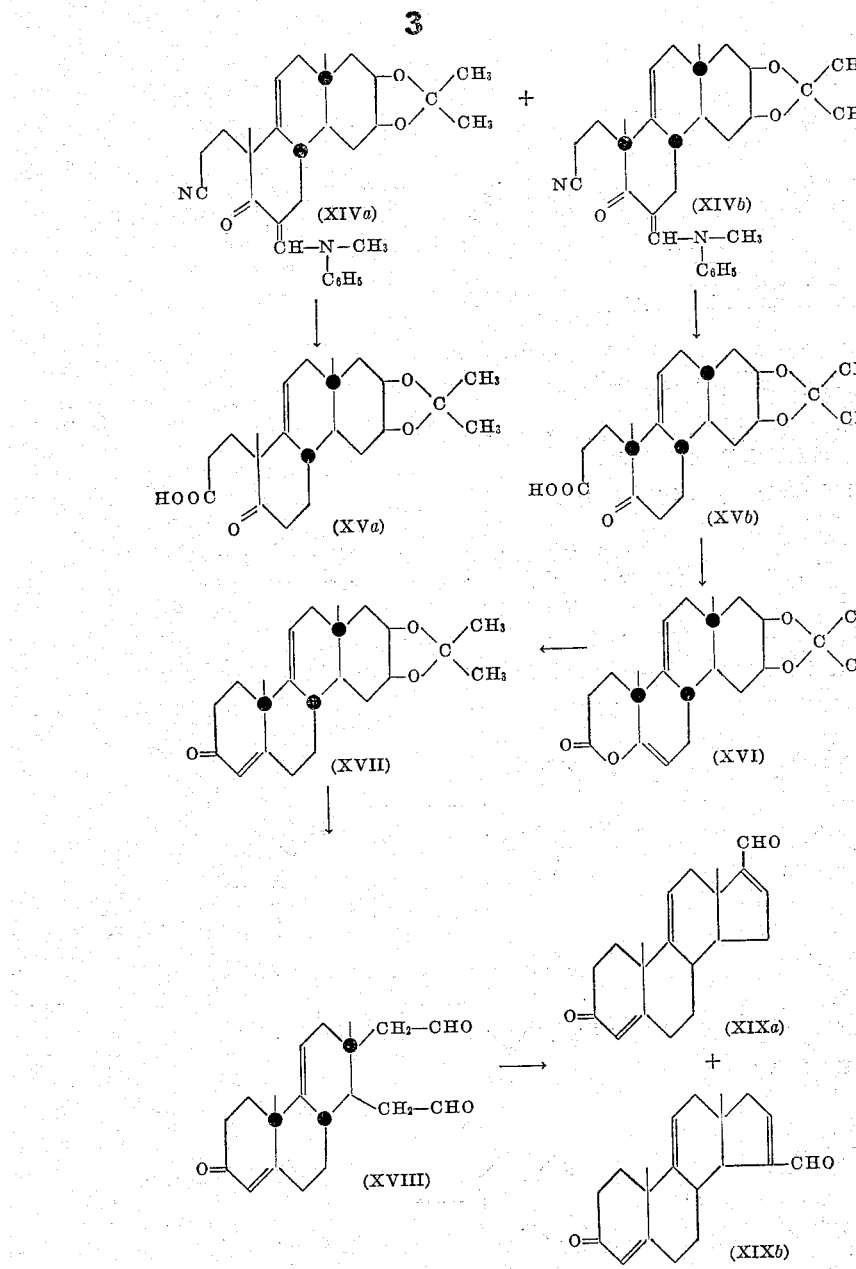

The cis-adduct (M. P. 93–95° C.) obtained by the Diels-Alder condensation of 1,3-butadiene and 2-methyl-5-methoxy-benzoquinone is converted to the trans-adduct, trans-2-methoxy-10-methyl - 5,8,9,10 - tetrahydro - 1,4 - naphthoquinone (I) by dissolving in an aqueous alkaline organic solvent and acidifying after seeding with the trans-isomer.

The trans-adduct is reduced to the corresponding glycol (II) with lithium aluminum hydride, and the glycol is converted to the ketol, 1-hydroxy - 2 - keto - 10 - methyl - 1,2,5,8,9,10 - hexahydronaphthalene (III), by treatment with a dilute mineral acid. The ketol is then esterified (IV) with any organic carboxylic acid, for example, acetic acid.

The ketol ester (IV) is reduced by treatment with zinc in acetic anhydride or in an inert organic solvent to 2-keto-10-methyl-1,2,5,8,9,10-hexahydronaphthalene (V). The bicyclic ketone (V) is formylated at position 1 to give the 1-hydroxymethylene derivative (VI), which is condensed with ethylvinylketone to give 1-formyl-1-(β-propionylethyl)-2-keto-10-methyl-1,2,5,8,9,10-hexahydronaphthalene (VII).

Treatment of compound (VII) with mild condensing agents such as potassium hydroxide in an aqueous organic solvent or hydrogen chloride in acetic acid converts it to the tricyclic ketone, 1,14 - dimethyl-2-keto-2,3,4,5,8,12,13,14 - octahydrophenanthrene (VIII), which has the desired anti-trans configuration.

The tricyclic ketone (VIII) is oxidized to the 6,7-glycol (IX). Oxidation with osmium tetroxide typically gives the two cis-isomers both of which are usable in the succeeding steps of the method. Other oxidizing agents may give the trans-isomers, which may also be used in the succeeding steps. Perbenzoic acid gives a 6,7-oxide which hydrolyzes to the trans-glycols. Silver benzoate and iodine gives the dibenzoate of the glycol. Hydrogen peroxide may also be used as the oxidizing agent, for example, with osmium tetroxide as catalyst.

The hydroxyl groups of the glycol (IX) are protected by reaction with a ketone, such as acetone (X), and protected compound hydrogenated at the 9,10-double bond, for example, with hydrogen at atmospheric pressure in a non-polar solvent, such as dry benzene, in the presence of a hydrogenating catalyst, to produce the dihydro derivative (XI), which is formylated at position 3 (XII). The formyl group of compound (XII) is protected by reacting it with a secondary amine, such as methylaniline, to give the methylanilino derivative (XIII).

Compound XII is reacted with acrylonitrile in the presence of a quaternary nitrogen base to give the isomeric cyanoethyl compounds XIVa and XIVb, which are preferably not separated at this stage but are hydrolyzed to the corresponding carboxyethyl compounds. The keto acids may be separated by taking them up in ether. A keto acid (XVa) melting at 150° C. (labile) and 170° C. (stable) crystallizes from the ether and the other isomeric keto acid (XVb) is obtained as an oil by evaporation of the ether. The oily acid has the desired configuration at asymmetric carbon atom 1.

The keto acid (XVb) is converted to the enol lactone (XVI), for example, by boiling with acetic anhydride in the presence of a small amount of sodium acetate. The lactone (XVI) is now converted to the tetracyclic ketone (XVII), having a D-homosteroid ring structure by condensing with a methyl magnesium halide, decomposing the addition product with acid and treating the product thus obtained with dilute aqueous alkali in a water-miscible organic solvent.

The homo-D-ring of ketone (XVII) may now be converted to a cyclopentano ring by opening and reclosing the ring, for example, by the following steps: The ketone (XVII) is oxidized, for example, with $HIO_4$, to the dialdehyde (XVIII), 1,2 - bis(aldehydomethyl) -2,13-dimethyl-7-keto-1,2,3,5,6,7,9,10,11,13-decahydrophenanthrene, and the dialdehyde is condensed to the 17-aldehyde steroid, $\Delta 9,(11),16$-bisdehydro-21-norprogesterone (XIX) by heating a solution of the dialdehyde in an organic solvent. Some of the isomeric 15-aldehyde (XIXa) is also formed. The aldehydes XIX and XIXa have the same steric configuration at the asymmetric carbon atoms as the natural steroid hormones of the adrenal cortex such as cortisone and may be converted into these hormones by already available procedures.

The following specific examples are illustrative of the methods and compounds of the invention:

*Isomerization of the cis-adduct to the trans-adduct*

Sixty grams of the cis-adduct (M. P. 93–95° C.) obtained by the Diels-Alder condensation of 1,3-butadiene and 2-methyl-5-methoxybenzoquinone, purified by recrystallization and almost colorless, is dissolved in 80 ml. of dioxane. Solution is facilitated by warming to 40–50° C. Five per cent more than the calculated amount of about 1N sodium hydroxide solution (312 ml., 0.975 N) is added over 10 min. with stirring in an atmosphere of nitrogen. A brownish orange solution containing about 1 g. of suspended solid is obtained. This solution is diluted by the addition of 600 ml. of water and then seeded with 3 g. of finely powdered trans-adduct (M. P. 125–127° C.). At this point it is essential to ascertain that most of the seed has remained undissolved. If there be excess alkali present, the seed material will of course go into solution; in that case more trans-adduct should be added till there is an appreciable amount of undissolved solid in suspension. About 1 N hydrochloric acid is added dropwise to the seeded solution with vigorous stirring; a solid starts to separate immediately. Addition of acid is stopped when the solution changes color to lemon yellow indicating complete neutralization (pH 5) of the base. Some more water (200 ml.) is added and the solid product is collected by filtration, washed four times with water and dried. A finely granular, light tan colored solid, M. P. 126–129° C., is obtained. This material is pure enough for use in the next step without further purification.

*Glycol (II).*—The trans-adduct (I) (130 g.) in dry pure redistilled tetrahydrofuran (1 l.) is slowly added to a stirred solution of lithium aluminum hydride (24 g.) in dry ether (1.4 l.) in an atmosphere of nitrogen. The addition is controlled so as to keep the mixture refluxing gently (addition time ca. 2½ hrs.). During the addition a viscous sticky complex separates onto the stirrer, making stirring difficult. The complex towards the end of the addition becomes more granular, and at the end a suspension of a white powder is obtained. Stirring is continued for a further ½ hour, and ethyl acetate is then slowly added to the ice-cooled stirred suspension until no more reaction is observed (the reaction is very exothermic and the ethyl acetate must be added very carefully).

After the excess $LiAlH_4$ has been decomposed by the addition of ethyl acetate, a saturated solution of $Na_2SO_4$ is added dropwise, with stirring, to the reaction mixture. The white suspension soon becomes light yellow. During the entire addition of saturated sodium sulphate solution, rapid stirring is continued so that the $LiAlH_4$ complex clinging to the sides of the flask may be washed down. Addition of the saturated solution is continued until the precipitate becomes slightly wet (at which time it starts clinging to the sides of the flask). Without stopping the stirring about 200 gms. $MgSO_4$ (anhyd.) are added. Rapid stirring is continued for another 10 minutes. The precipitate is then filtered from the ethereal solution and washed thoroughly with excess ethyl ether. The filtrate and washings are concentrated, last traces of solvent removed at the water pump, and the viscous oil obtained is diluted with a small amount of ethyl ether and allowed to crystallize in the refrigerator overnight. The crude glycol melts at about 128–133° C.

*Ketol (III).*—The crude glycol (68 g.) is dissolved in reagent grade dioxan (375 cc.), and 2 N sulfuric acid (300 cc.) is added. The solution is allowed to stand for 24 hours at room temperature and is then poured into ether and water. The aqueous layer is washed twice more with ether, the combined ether solutions are washed with sodium bicarbonate solution, and the latter extract is again extracted with ether. The combined ethereal layers are washed once with salt solution, dried ($MgSO_4$), and evaporated. The remaining dioxan is completely removed on the water pump. The residue consisting of the crude ketol, partly solidifies on being seeded with a specimen of pure ketol (M. P. 71–72° C.)

*Ketol acetate (IV).*—The crude ketol (58 g.) is dissolved in dry pyridine (300 cc. reagent grade pyridine kept over potassium hydroxide for several days), and acetic anhydride (60 cc. reagent grade) is added. The solution from which moisture is excluded by a calcium chloride tube, is heated on the steam bath for a few minutes, and is then set aside overnight. Most of the pyridine is removed from the red solution at the water pump, ether is added to the residue and the solution is washed with water, excess dilute sulfuric acid, sodium bicarbonate and finally water. Each aqueous washing is extracted with ether, and the combined ether solutions are dried and evaporated. The crude acetate remains as a rather mobile orange oil.

*Bicyclic ketone (V).*—The crude acetate (60 g.) and redistilled acetic anhydride (550 cc.) are heated to 145–150° C. in a paraffin bath with stirring under reflux, with the exclusion of moisture. Commercial zinc dust (550 g.) is added all at once, and the mixture is stirred vigorously at this temperature for 8 minutes. The mixture is cooled in ice with stirring, the zinc is removed by filtration and thoroughly washed with ether. The ether is evaporated on the steam bath, and the acetic anhydride is distilled off on the water pump. The light yellow residue (ca. 110 g.) containing some solid is diluted with ether, and washed with water, dilute sulfuric acid and again water. The aqueous layers are extracted with ether, and the combined ether solutions are washed twice with sodium carbonate solution (each time for ca. 5 mins.) and then with water. The combined aqueous layers are washed with ether, the combined ether extracts are dried (MgSO4) and evaporated. The residue is distilled roughly into two fractions:

(a) B. P. 68–98° C./0.4 mm. and
(b) B. P. 117–137° C./0.4 mm.

Fraction (a) is redistilled slowly through a small Vigreux column to give the bicyclic ketone (V) as a colorless mobile liquid, B. P. 80–81° C./0.8 mm., $n_D^{23.5}$ 1.5167. On being seeded at room temperature (25° C.) it nearly completely solidifies, M. P. 26–29° C.

*Hydroxymethylene ketone (VI).*—Commercial sodium methoxide (35 g.) is covered with dry benzene (175 cc.) and redistilled ethyl formate (87 cc.) is added in a thin stream to the stirred mixture at room temperature in a nitrogen atmosphere. Stirring is continued at room temperature for a further ½ hour, when the mixture is cooled in ice. The bicyclic ketone (35 g.) in dry benzene (175 cc.) is added dropwise during 45 minutes with ice-cooling. More benzene (175 cc.) is added, and stirring in nitrogen is continued for a further 12 hours at room temperature. About 30 minutes after the end of the addition a voluminous yellow gelatinous precipitate separates, which does not change in appearance when the reaction was terminated. Ether and iced dilute sulphuric acid are added, the aqueous layer is washed with ether, and the combined ethereal layers are washed with excess potassium hydroxide solution. The red-brown alkaline aqueous layer is washed once with ether, acidified with dilute hydrochloric acid, and extracted twice with ether. The latter ether washings are washed once with water, dried, and evaporated. The residue contains some formic acid, and is therefore distilled through a small Vigreux column. This yields the hydroxymethylene ketone (VI) as a yellow mobile liquid, B. P. 88–90° C./0.015 mm., $n_D^{28}$ 1.5552.

More conveniently the hydroxymethylene compound may be isolated with benzene instead of ether. In that case the formic acid is removed when distilling off the benzene, and the crude undistilled hydroxymethylene ketone may be used for the next stage.

*Ethyl vinyl ketone adduct (VII).*—A solution of freshly distilled ethyl vinyl ketone (15.0 g.) and distilled hydroxymethylene ketone (VI) (29.0 g.) are dissolved in dry redistilled tert-butanol (120 cc.). The solution is cooled in ice, the air is displaced with nitrogen, and a solution of potassium tert-butoxide, prepared by dissolving potassium (600 mg.) in dry tert-butanol (22.5 cc.), is added. The solution is cooled until the butanol just starts to crystallize. The air is again displaced with nitrogen, and the solution is left at room temperature for 10 hours. On scratching a heavy precipitate separates; the mixture is ice-cooled, the adduct is filtered and washed with cold butanol. On being dried, the white sparkling plates melt at 98° C.

*Tricyclic ketone (VIII).*—The crystalline ethyl vinyl ketone adduct (VII) (18.9 g.) is dissolved in redistilled dioxan (760 cc.) and the solution is cooled in ice. A cooled solution of potassium hydroxide (19 g.) in water (760 cc.) is added, and the solution is allowed to stand at room temperature (ca. 30°) for 3 hours with occasional shaking. The initially clear solution becomes turbid after a few minutes and a small upper layer separates. Ether and water are added, the aqueous layer is washed twice with ether, the combined organic extracts are washed with water until neutral, and are then dried and evaporated. The dioxan is finally removed at the water pump, when the residue on being cooled completely solidifies. Crystallization from methanol yields the tricyclic ketone (VIII) as prisms, M. P. 70.5–72.5° C.

*Tricyclic ketone glycol (IX).*—Osmium tetroxide (32.394 g.) is dissolved in Na-dried ether (350 cc.) or in benzene and ether (100 cc. benzene, to make a 27% solution, plus 250 cc. ether) and cooled. The OsO4 solution is added to a cooled ether solution (730 cc.) of tricyclic ketone (VIII) (29.791 g.; 20 mg. in excess of calculated amount) with swirling. The solution is set aside at room temperature in a dark place for 5 to 8 days. The ether solution is decanted through a filter, and the complex is dissolved in methylene dichloride (500 cc.) and shaken mechanically with a solution of mannitol (167 g.) and potassium hydroxide (47.5 g.) in water (1250 cc.) for 1 hour or until the methylene chloride layer is very pale yellow. The methylene chloride layer is separated; the aqueous layer is saturated with sodium chloride and extracted four times wtih chloroform. The combined CH2Cl2—CHCl3 extracts are washed twice with saturated sodium chloride solution, dried with anhydrous Na2SO4, and concentrated on the steam bath and in vacuo. The residual gum is triturated with benzene (125 cc.). After cooling somewhat the white solids are filtered off. They melt at 135–150° C., and give the desired glycol (IX), M. P. 152–156° C., after one recrystallization from CHCl3-benzene.

*Tricyclic isopropylidene ketone (X).* The tricyclic ketone glycol (IX) (20 g.) is placed in a strong 2-liter Pyrex bottle with anhydrous CuSO4 (100 g.) and dry acetone (2000 cc.). The bottle is stoppered securely and shaken mechanically for 36 hours. The CuSO4 is removed by filtration through sintered glass, and the acetone solution is shaken with a small amount of anhydrous K2CO3, filtered, and evaporated to dryness using a water aspirator. The residue, on crystallization from benzene-petroleum ether, gives the isopropylidene compound (X), M. P. 95–98° C.

*Mono-unsaturated tricyclic isopropylidene ketone (XI).*—The tricyclic isopropylidene ketone (X) (14.727 g.) is stirred in an atmosphere of hydrogen in the presence of prereduced 2% palladium on strontium carbonate catalyst (7.3 g.) in 100 cc. Na-dried benzene. In 3 hours 25 minutes, 1224 cc. hydrogen has been absorbed by which time the absorption of hydrogen has become drastically slower and the reduction is stopped. The catalyst is filtered off through a sintered glass funnel, and washed with reagent grade benzene, and most of the benzene is removed in vacuo. The residual solution is diluted with petroleum ether and the mono-unsaturated tricyclic isopropylidene ketone (XI) separates as a fine white powder, M. P. 153–156° C.

*Hydroxymethylene mono-unsaturated tricyclic isopropylidene ketone (XII).*—In an atmosphere of nitrogen, freshly prepared sodium methoxide (13.1 g.) is covered with dry benzene (175 cc.) and $K_2CO_3$-dried and distilled ethyl formate (33 cc.) is added to the stirred mixture in a thin stream. The mixture is stirred at room temperature for 30 minutes, and a solution of the mono-unsaturated tricyclic isopropylidene ketone (24 g.) in dry benzene (150 cc.) is added. Stirring at room temperature is continued for about 1 hour or until the mixture has solidified to a gelatinous mass. After standing under nitrogen overnight, phosphate buffer solution (1406 cc.; 156 cc. 0.7 M $KH_2PO_4$ plus 1250 cc. 0.7 M $Na_2HPO_4$) is added with stirring, and the layers are separated. The pH of the aqueous layer is adjusted to pH 8 by adding a few cc. of the $KH_2PO_4$ solution, if necessary. The solution is extracted with ether 4 times, the combined organic layers are dried with $Na_2SO_4$ and concentrated to dryness on the steam bath and in vacuo. The crude hydroxymethylene compound (XII) solidifies when all the solvent is removed.

*Methylanilino derivative (XIII).*—The crude hydroxymethylene compound (XII) (29 g.) is dissolved in methanol (275 cc.) and methylaniline (57 cc.). After standing overnight the yellow crystalline methylanilino compound (XIII) is filtered off and washed with petroleum ether until the odor of methyl aniline can not be detected. It melts at 218–222.5° C.

*Cyanoethyl derivatives (XIVa and XIVb).*—The methylanilino derivative (XIII) (30.2 g.) is dissolved by warming in a mixture of dry benzene (500 cc.) and dry t-butanol (1000 cc.). Acrylonitrile (13.2 g.) and "Triton B" (48.5 cc. of a 3.5% solution in t-butanol+3.5 cc. water) are added. The air is displaced by nitrogen and the reaction mixture is left at 50° C. for 45 hours. The solvents are removed in vacuo and the dark red residue is eluted several times with ether (ca. 400 cc.) to separate insoluble acrylonitrile polymer. Evaporation of the ether leaves the stereoisomeric cyanoethyl derivatives (XIVa and XIVb) as an orange gum.

*Carboxyethyl derivatives (XVa and XVb).*—The cyanoethyl derivatives (XIVa and XIVb) are preferably not separated but are converted to the corresponding carboxyethyl derivatives by vigorous basic hydrolysis. The mixture of (XIVa and XIVb) (ca. 35 g.) is refluxed for 7 hours under nitrogen with potassium hydroxide (40 g.) and water (250 cc.).

Extraction with ether affords a small quantity of mono-unsaturated tricyclic isopropylidene ketone XI. Acidification of the aqueous layer with cold dilute (1:10) hydrochloric acid in the presence of ether followed by two ether extractions, drying and thorough removal of volatile materials gives a crude mixture of the stereoisomeric acids (XVa and XVb). Repeated trituration with ether causes the precipitation of isomer (XVa), M. P. 148–150° C. (labile form) and 170–173° C. (stable form). Crude isomer (XVb) is left as an amber gum on evaporation of the ether.

*Enol lactone (XVI).*—Crude isomer (XVb) (10.7 g.) and distilled acetic anhydride (80 cc.) are refluxed for 2 hours under nitrogen. Sodium acetate (0.1 g.) is added and refluxing is continued for 2 hours more. Most of the acetic anhydride is removed in vacuo. Ether is added and the ether solution is washed with dilute sodium carbonate solution and water. Evaporation of the dried ether extract leaves a residue which partially crystallizes on addition of ether, to give crude enol lactone (XVI), M. P. 185–210° C. Further crops of less pure (XVI) may be obtained. The highest melting point of this compound has been 240° C. (dec.), but material melting above 175° C. is satisfactory for further reaction.

*D-homosteroid (XVII).*—The enol lactone (XVI) (2.18 g.), M. P. 185–210° C., is dissolved in dry benzene (40 cc.) and dry ether (40 cc.) under nitrogen. The mixture is cooled to −18° C. and a solution of methylmagnesium bromide in dry ether (21.3 cc.; 0.285 N) is added dropwise with vigorous stirring over 2–3 hours. Dilute hydrochloric acid (60 cc., 1:10) is added rapidly with stirring. The layers are separated and the aqueous layer washed with ether. The combined ether layers are washed with a little cold water, dried and the solvent removed. The solid residue is refluxed for 2 hours under nitrogen with methanol (180 cc.), water (20 cc.) and sodium hydroxide (1.95 g.). Saturated salt solution is added, and the product is extracted with ether. The dried extract on evaporation gives the D-homosteroid (XVII), which on crystallization from ethanol or benzene-ligroin has M. P. 199–202° C.

*Dialdehyde (XVIII).*—The D-homosteroid (XVII) (2.10 g.) is dissolved in pure dioxan (175 cc.), and periodic acid (4.1 g.) in water (28 cc.) is added. The homogeneous solution is allowed to stand at room temperature in a nitrogen atmosphere for 15 hours; most of the dioxan is then removed in vacuo, water is added to the residue, and the product is extracted with ether. The dried extract is evaporated to yield the crude dialdehyde as a crystalline residue, which on crystallization from ether has M. P. 128–132° C.

*Steroid (XIXa).*—Heating the dialdehyde (XVIII) in solution recloses ring D to give the 17-aldehyde steroid (XIXa). The dialdehyde (XVIII) (1.87 g.) is dissolved in pure dioxan (100 cc.) containing a trace of hydroquinone. Pure water (64 cc.) is added, and the solution is heated in sealed glass tubes in a nitrogen atmosphere for 7½ hours at 145° C. Ether is then added, the solution is washed with sodium bicarbonate solution and water, and is dried and evaporated. Addition of methanol causes the precipitation of the steroid (XIXa), M. P. 165–170° C. The mother liquors are sublimed at 160°/$10^{-3}$ mm., and the sublimate with methanol gives a further crop of (XIXa). The combined crops on crystallization from methanol give pure (XIXa), M. P. 171–173° C. The mother liquors, after the second crop of the steroid has been removed, give further crops of crystalline material. Recrystallization of these from aqueous methanol gives impure isomer (XIXb), M. P. 145–150° C.

The dialdehyde (XVIII) may also be converted into the tetracyclic 17-aldehyde (XIXa) in good yield by heating a solution in benzene at 60° C. in the presence of piperidine acetate for about an hour.

Comparison of derivatives of the 17-aldehyde with similar derivatives of the naturally occurring steroid hormones of the adrenal cortex, such as Kendall's compound E, shows that the 17-aldehyde is identical in steric configuration with the natural steroid hormones.

This application is a continuation-in-part of my application Serial No. 220,977 filed April 13, 1951.

Subject matter disclosed in this application is also claimed in my applications Serial Nos. 269,329, now Patent No. 2,672,482, and 269,330, filed January 31 1952.

I claim:

1. 2-keto - 10 - methyl-1,2,5,8,9,10 - hexahydronaphthalene.

2. The method which comprises reducing an organic carboxylic ester of 1-hydroxy-2-keto-10-methyl-1,2,5,8,9,10 - hexahydronaphthalene with zinc in acetic anhydride and recovering the 2-keto-10-methyl-1,2,5,8,9,10 - hexahydronaphthalene thereby produced.

References Cited in the file of this patent

UNITED STATES PATENTS

| Number | Name | Date |
|---|---|---|
| 2,324,881 | Ruzicka et al. | July 20, 1943 |
| 2,542,223 | Wendler et al. | Feb. 20, 1951 |